US006760655B2

(12) United States Patent
Matsubara et al.

(10) Patent No.: US 6,760,655 B2
(45) Date of Patent: Jul. 6, 2004

(54) AUTOMATIC ENGINE STOP/RESTART-TYPE VEHICLE, METHOD OF CONTROLLING THE SAME, AND AUTOMATIC ENGINE STOP APPARATUS

(75) Inventors: Tooru Matsubara, Toyota (JP); Yasuo Hojo, Nagoya (JP); Hideo Tomomatsu, Nagoya (JP); Yoshikazu Tanaka, Toyota (JP); Tadasu Tomohiro, Toyota (JP); Katsumi Nakatani, Nisikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 39 days.

(21) Appl. No.: 10/166,014

(22) Filed: Jun. 11, 2002

(65) Prior Publication Data

US 2002/0193930 A1 Dec. 19, 2002

(30) Foreign Application Priority Data

Jun. 14, 2001 (JP) ........................................ 2001-180660

(51) Int. Cl.⁷ .............................. G06F 7/00; G06G 7/70
(52) U.S. Cl. ........................... 701/54; 701/51; 701/112; 701/113
(58) Field of Search .............................. 701/51, 53, 54, 701/22, 101, 102, 112, 113; 477/107, 110, 111, 116, 117, 121, 154, 155, 161, 109, 3, 5–8, 99, 156–158; 123/179.4, 198 DB, 366, 685, 179.1, 179.3; 240/40 A, 40 R, 34, 51

(56) References Cited

U.S. PATENT DOCUMENTS

| 4,982,622 | A | 1/1991 | Yamamoto et al. | ......... 477/117 |
| 4,984,485 | A | 1/1991 | Kojima et al. | ............... 477/116 |
| 5,466,199 | A | 11/1995 | Kobayashi et al. | ......... 477/107 |
| 5,478,293 | A | 12/1995 | Yonezawa | ................... 477/110 |
| 5,938,563 | A | 8/1999 | Nishio et al. | ................ 477/117 |
| 6,007,451 | A | * 12/1999 | Matsui et al. | .................. 477/19 |
| 6,106,432 | A | 8/2000 | Nishida | ....................... 477/116 |
| 6,275,759 | B1 | * 8/2001 | Nakajima et al. | ............. 701/54 |
| 6,347,608 | B1 | * 2/2002 | Hara et al. | ............... 123/179.4 |
| 6,390,947 | B1 | * 5/2002 | Aoki et al. | ..................... 477/3 |
| 6,401,012 | B1 | 6/2002 | Aoki et al. | ..................... 701/1 |
| 2002/0059019 | A1 | * 5/2002 | Nakao et al. | ................. 701/22 |
| 2002/0086772 | A1 | * 7/2002 | Abe et al. | ..................... 477/102 |
| 2002/0091034 | A1 | * 7/2002 | Nakamori et al. | ............. 477/3 |

FOREIGN PATENT DOCUMENTS

| DE | 100 41 789 A1 | 5/2001 | |
| EP | 742395 A2 | * 11/1996 | ........... F16H/61/20 |
| JP | A 8-14076 | 1/1996 | |
| JP | A 10-324177 | 12/1998 | |
| JP | 2000016122 A | * 1/2000 | ........... B60K/41/06 |
| JP | A 2000-199561 | 7/2000 | |
| JP | A 2000-356148 | 12/2000 | |
| JP | A 2001-32917 | 2/2001 | |

OTHER PUBLICATIONS

Tomomatsu et al., "Automatic Transmission Control System Developed for Toyota Mild Hybrid System (THS–M)", SAE Technical Paper Series, pp. 1–6, 2002.

* cited by examiner

Primary Examiner—Jacques H. Louis-Jacques
(74) Attorney, Agent, or Firm—Oliff & Berridge, PLC

(57) ABSTRACT

An automatic engine stop/restart-type vehicle and control method determine whether a vehicle is in a non-running range. The vehicle comprises: an engine; a transmission, an oil pump and a controller. The transmission has a coupling element that transmits an output torque of the engine. The oil pump supplies a hydraulic pressure to the transmission. The controller controls an output from the engine; controls the hydraulic pressure supplied to the transmission; and determines whether the engine is in an automatic stop state when a manually set mode of the transmission is shifted from a non-running range to a running range. A hydraulic pressure compensation procedure is performed to conform friction coupling characteristics of the coupling element and input characteristics of the transmission with each other if the controller determines that the engine is in the automatic stop state.

18 Claims, 4 Drawing Sheets

AUTOMATIC ENGINE STOP/RESTART-TYPE VEHICLE, METHOD OF CONTROLLING THE SAME, AND AUTOMATIC ENGINE STOP APPARATUS

INCORPORATION BY REFERENCE

The disclosure of Japanese Patent Application No. 2001-180660 filed on Jun. 14, 2001 including the specification, drawings and abstract is incorporated herein by reference in its entirety.

BACKGROUND OF THE INVENTION

1. Field of Invention

The invention relates to an automatic engine stop/restart-type vehicle having an engine that is stopped automatically upon fulfillment of a predetermined one of running conditions of the vehicle, to a method of controlling the vehicle, and to an apparatus that stops an engine automatically.

2. Description of Related Art

A vehicle having an engine that is stopped automatically upon fulfillment of a predetermined one of running conditions of the vehicle and that is restarted automatically for takeoff by a certain operation performed by a driver such as depression of an accelerator pedal is known for a long time as a so-called economy running vehicle. In the case where an automatic transmission is adopted in such an automatic engine stop/restart-type vehicle, a mechanical oil pump driven by an engine maintains hydraulic fluid in a friction coupling element and a change-gear mechanism of the automatic transmission at a certain pressure. If the engine is stopped automatically upon fulfillment of a predetermined running condition of the vehicle, the mechanical oil pump driven by the engine is stopped as well. For this reason it becomes impossible to maintain hydraulic fluid in the automatic transmission at a certain pressure when the engine is restarted.

In an attempt to solve this problem, Japanese Patent Application Laid-Open No. 8-14076 discloses holding forward clutches in an automatic transmission in an engaged state even during stoppage of an engine by installing an accumulator. As another solution, Japanese Patent Application Laid-Open No. 10-324177 discloses the idea of additionally providing an electric oil pump capable of supplying a hydraulic pressure at which a forward or backward friction coupling element is about to be coupled if an engine is stopped while a vehicle is running with a shift lever at a forward or backward position.

FIG. 5 is an exemplary diagram showing how component members of a typical economy-running vehicle are arranged in relation to one another, and how an electric oil pump is arranged in relation to the other component members. (The controller 100 of FIG. 5 is part of the present invention, and is not prior art.) An output torque of an engine 1 is input to an automatic transmission 3 via a torque converter 2 and output to an output shaft 4 of a vehicle. An electric oil pump 6 is disposed in parallel with a mechanical oil pump 5 driven by the engine 1. An output from the electric oil pump 6 is combined with an output from the mechanical oil pump 5 via a check valve 7 and then transmitted to the automatic transmission 3. The electric oil pump 6 is supplied with electric power from a battery 8 via a driver circuit 9, which is connected to an oil pump control device 10.

It will now be described how the typical construction (without controller 100 of the invention) operates. When the engine 1 is running, an output torque of the engine 1 is output to the output shaft 4 via the torque converter 2 and the automatic transmission 3, and drives the mechanical oil pump 5 at the same time. A hydraulic pressure generated at this moment is transmitted through a hydraulic circuit and suitably controlled by hydraulic pressure control means (not shown). The hydraulic pressure thus controlled is supplied to the automatic transmission 3. On the other hand, if the engine 1 is stopped automatically and assumes an economy-running state, the mechanical oil pump 5 stops operating and no longer generates a hydraulic pressure. In this case, the oil pump control device 10 transmits a drive signal for controlling operation of the electric oil pump 6 to the driver circuit 9, such that the electric oil pump 6 is operated. Electric power in the battery 8 is then supplied to the electric oil pump 6 via the driver circuit 9, such that the electric oil pump 6 is operated and generates a hydraulic pressure. This hydraulic pressure is transmitted through the hydraulic circuit via the check valve 7, suitably controlled by the hydraulic pressure control means (not shown), and supplied to the automatic transmission 3. The check valve 7 prevents a high hydraulic pressure in the mechanical oil pump 5 from being transmitted back to the electric oil pump 6.

It is not the mechanical oil pump 5, but the electric oil pump 6 that operates when the engine is out of operation. The electric oil pump 6 maintains hydraulic fluid in the change-gear mechanism and the friction coupling element at a certain pressure. As a result, the engine can be restarted appropriately.

For example, according to Japanese Patent Application Laid-Open No. 10-324177 mentioned above, if the engine is stopped while the vehicle is running with the shift lever at the forward or backward position, the electric oil pump capable of supplying a hydraulic pressure at which the forward or backward friction coupling element is about to be coupled is additionally provided, whereby a shock caused during restart of the engine is absorbed. As a result, it becomes possible to improve driveability of the vehicle.

In the case where a manually set mode of the automatic transmission is shifted from a non-running range (N or P range) to a running range (D or R range), the following problem arises. For instance, if an accelerator pedal and a brake pedal have been turned off and on respectively while the vehicle is stopped, setting the manually set mode as a non-running range is defined as an economy-running condition in a strict sense for convenience of explanation. Even if this economy-running condition in a strict sense is fulfilled, the vehicle sometimes remains in a non-economy-running state in which the engine is in operation without shifting to a so-called economy-running state in which the engine is stopped automatically. That is, the vehicle is designed in principle not to stop the engine if it is necessary to refrain from stopping the engine for reasons of the maintenance of basic systems of the vehicle. Fulfillment of a condition required for the maintenance of the systems can be defined as an economy-running condition in a broad sense. Even if the economy-running condition in a strict sense is fulfilled, the engine is not stopped automatically unless the economy-running condition in a broad sense is fulfilled. For instance, the economy-running condition in a broad sense may be that the battery has a sufficient amount SOC of charge, that a booster of the brake making use of a negative pressure in the engine is at a sufficient negative pressure, or that a condition concerning the temperature of coolant is fulfilled.

Accordingly, when the vehicle is in a non-running range, there are two cases, that is, the case of a non-economy-running state in which the engine is running with the economy-running condition in a broad sense unfulfilled and the case of an economy-running state in which the engine has been stopped automatically with both the economy-running condition in a strict sense and the economy-running condition in a broad sense fulfilled. If a so-called garage shift for changing the manually set mode from a non-running range to a running range is taken into account, it becomes apparent that there are two cases, namely, the first case where a garage shift is made while the engine is running and the second case where a garage shift is made while the engine has been stopped automatically.

In the first case where a shift is made from a non-running range to a running range in a non-economy-running state in which the engine is running, since the engine generates a torque and the mechanical oil pump is in operation, the original hydraulic pressure supplied to the automatic transmission is sufficiently high. On the other hand, in the second case where a shift is made from a non-running range to a running range in an economy-running state in which the engine has been stopped automatically, since the engine does not generate a torque and the mechanical oil pump is out of operation, the original hydraulic pressure supplied to the automatic transmission is lower as compared with the first case. This hydraulic pressure is supplied, for example, from the electric oil pump. Because the friction coupling element in the automatic transmission is in a disengaged state when the vehicle is in a non-running range, such as N range or P range, the first and second cases are significantly different from each other in terms of conformity between friction coupling characteristics of the friction coupling element based on the rising of the hydraulic pressure supplied to the automatic transmission and input characteristics of the automatic transmission based on the rising of the torque generated by the engine. Therefore, optimal transition characteristics and optimal speed-change characteristics cannot be achieved if the first and second cases are handled in the same manner. As a result, driveability of the vehicle is a problem.

In the case where the manually set mode of the automatic transmission is thus shifted from a non-running range to a running range, the problem regarding conformity between friction coupling characteristics of the friction coupling element and input characteristics of the automatic transmission is caused as described above. However, there is no related art offering a desirable solution to the problem.

SUMMARY OF THE INVENTION

It is an object of the invention to provide a vehicle capable of solving the problem regarding conformity between friction coupling characteristics of a coupling element (such as an axle clutch) and input characteristics of an automatic transmission in the case where a manually set mode of the automatic transmission is shifted from a non-running range to a running range and achieving optimal transition characteristics and optimal speed-change characteristics. It is also an object of the invention to provide a method of controlling the vehicle. It is further an object of the invention to provide an apparatus that stops an engine automatically.

A vehicle according to a first aspect of the invention has an engine, an automatic transmission having a coupling element for transmitting an output torque of the engine, an oil pump for supplying a hydraulic pressure to the automatic transmission, and a controller that: controls an output from the engine, and controls a hydraulic pressure supplied to the automatic transmission. The engine is stopped automatically upon fulfillment of a predetermined one of running conditions of the vehicle. The controller determines whether or not the engine is in an automatic stop state when a manually set mode of the automatic transmission is shifted from a non-running range to a running range. Hydraulic pressure compensation control is performed by the controller so as to conform friction coupling characteristics of the coupling element and input characteristics of the automatic transmission with each other if the controller determines that the engine is in an automatic stop state.

According to the aforementioned first aspect of the invention, the controller determines whether or not the engine is in an automatic stop state when the manually set mode of the automatic transmission is shifted from a non-running range to a running range. The controller performs hydraulic pressure compensation control if the controller determines that the engine is in an automatic stop state. The problem regarding conformity between friction coupling characteristics of the friction coupling element and input characteristics of the automatic transmission is thus prevented from being caused due to a difference in original hydraulic pressures supplied to the automatic transmission in the case where the manually set mode is shifted from a non-running range to a running range. As a result, optimal transition characteristics and optimal speed-change characteristics can be achieved.

A vehicle according to a second aspect of the invention has an engine, an automatic transmission having a friction coupling element for transmitting an output torque of the engine, an oil pump for supplying a hydraulic pressure to the automatic transmission, and a controller that: controls an output from the engine, controls a hydraulic pressure supplied to the automatic transmission. The engine is stopped automatically upon fulfillment of a predetermined one of running conditions of the vehicle. The controller determines whether or not the engine is in an automatic stop state when a manually set mode of the automatic transmission is shifted from a non-running range to a running range. Loosening control of throttle opening characteristics is performed in relation to an accelerator opening so as to conform friction coupling characteristics of friction coupling element and input characteristics of the automatic transmission with each other if the controller determines that the engine is in an automatic stop state.

According to the aforementioned second aspect, the controller determines whether or not the engine is in an automatic stop state when the manually set mode of the automatic transmission is shifted from a non-running range to a running range. The controller performs loosening control of the throttle opening characteristics in relation to the accelerator opening if the controller determines that the engine is in an automatic stop state.

Therefore, the problem regarding conformity between the friction coupling characteristics of the friction coupling element and the input characteristics of the automatic transmission can be prevented from being caused due to a difference in delays of the rising of the friction coupling characteristics of the friction coupling element when the manually set mode is shifted from a non-running range to a running range. As a result, optimal transition characteristics and optimal speed-change characteristics can be achieved.

A vehicle according to a third aspect of the invention has an engine, an automatic transmission having a friction coupling element for transmitting an output torque of the engine, an oil pump for supplying a hydraulic pressure to the automatic transmission, and a controller that: controls an output from the engine, controls a hydraulic pressure supplied to the automatic transmission. The engine is stopped automatically upon fulfillment of a predetermined one of running conditions of the vehicle. The controller determines whether or not the engine is in an automatic stop state when a manually set mode of the automatic transmission is shifted from a non-running range to a running range. Anti-squat shifting control for absorbing an impact caused in changing the manually set mode of the automatic transmission is prohibited so as to conform friction coupling characteristics of friction coupling element and input characteristics of the automatic transmission with each other if the non-running range state determination element determines that the engine is in an automatic stop state.

According to the aforementioned third aspect of the invention, the controller determines whether or not the engine is in an automatic stop state when a manually set mode of the automatic transmission is shifted from a non-running range to a running range. Anti-squat shifting control for absorbing an impact during the shift of the manually set mode is prohibited from being performed in the automatic transmission if the controller determines that the engine is in an automatic stop state. Accordingly, a time lag in the rising of the torque of the output shaft can be prevented from being caused when the manually set mode is shifted from the non-running range to the running range. As a result, it becomes possible to solve the problem regarding conformity between the friction coupling characteristics of the friction coupling element and the input characteristics of the automatic transmission and achieve optimal transition characteristics and optimal speed-change characteristics.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 6 is a block diagram illustrating one exemplary embodiment of a system for controlling an automatic engine stop/restart-type vehicle according to this invention.

DETAILED DESCRIPTION OF EXEMPLARY EMBODIMENTS

Hereinafter, three embodiments of the invention will be described in detail with reference to the drawings.

In accordance with the various exemplary embodiments of this invention, a controller 100 is implemented that receives a plurality of signals from various detection device in the vehicle, process the signals and generates various control signals that control the operation of the vehicle.

In accordance with the exemplary embodiments, the controller 100 is implemented as a programmed general purpose electronic control unit. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

Figure 1A:
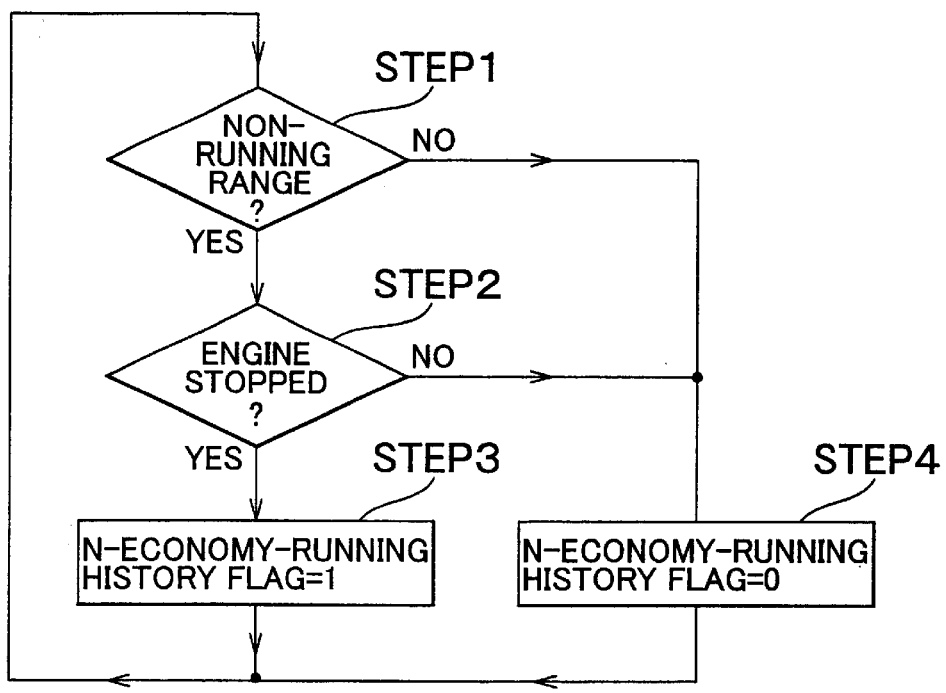
FIGS. 1A and 1B show flowcharts that are used in common in three embodiments of the invention.
Figure 1B:
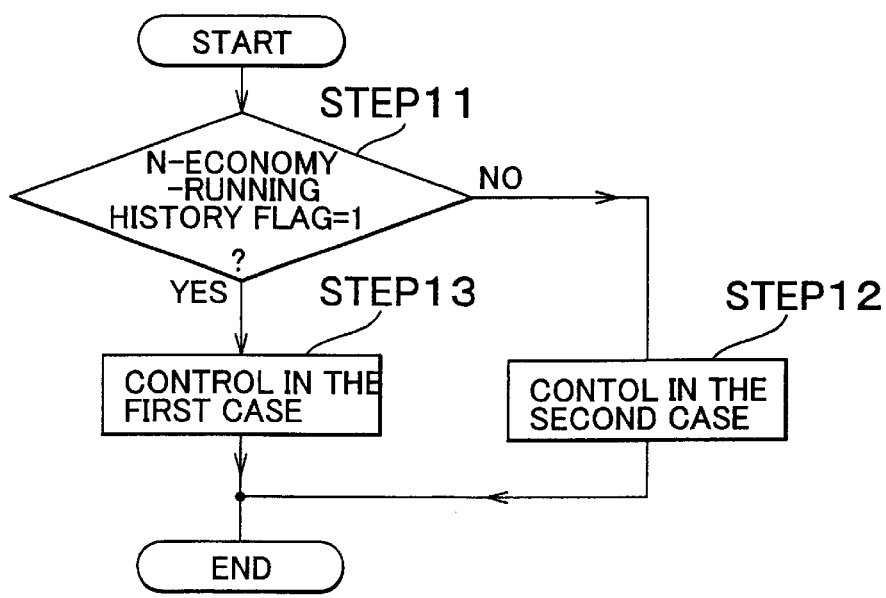
Figure 2A:
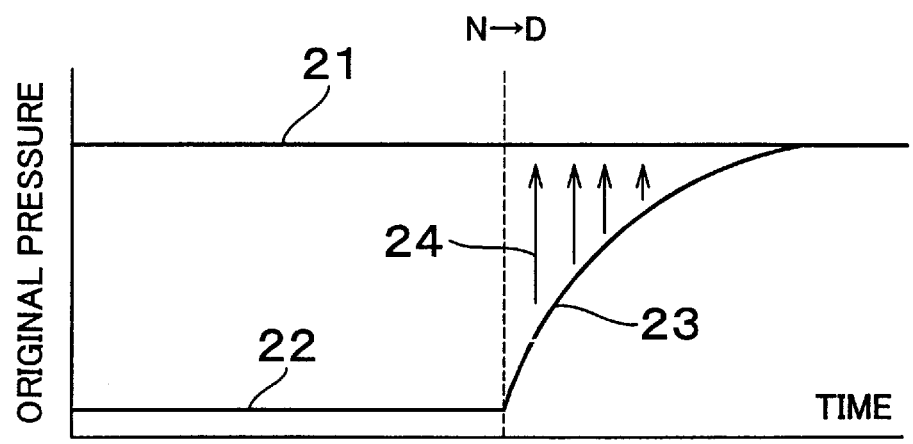
FIGS. 2A and 2B are graphs that respectively illustrate control operations performed in first and second cases according to the first embodiment of the invention (while the axis of the abscissa represents time, the axes of the ordinate in FIGS. 2A and 2B represent original hydraulic pressure and engine speed respectively)

The flowcharts and each of the associated routines shown in FIGS. 1A and 1B are used in the three embodiments. Each of the control procedures illustrated in each of the subroutines in FIGS. 1A and 2A are performed in accordance with a control signal processed and generated by the controller 100. Examples of such control comprise: determining running and non-running range state controls, hydraulic pressure compensation control, anti-squat shifting control, etc. Each of these control procedures will be described in more detail below.

The flowchart shown in FIG. 1A includes a non-running range state determination procedure performed by the controller to determine whether or not an engine is in an automatic stop state when a manually set mode of an automatic transmission is shifted from a non-running range to a running range. The flowchart shown in FIG. 1B includes a procedure through which the automatic transmission performs control in two different cases, on the basis of a determination made by the controller performing a non-running range state determination procedure.

In FIG. 1A, STEP 1 represents a procedure of determining whether or not the manually set mode of the automatic transmission is in the non-running range.

STEP 2 represents a procedure of determining whether or not the engine has been stopped automatically.

STEP 3 represents a procedure of setting a flag as 1 if both the results of STEP 1 and STEP 2 are YES. If this flag has been set as 1, it indicates that the vehicle is in an economy-running state. Hence, this flag is referred to as an N-economy-running history flag.

STEP 4 represents a procedure of setting the N-economy-running history flag as 0 to indicate that the vehicle is in a non-economy-running state if both the results in STEP 1 and STEP 2 are NO.

After it is determined in STEP 3 that the N-economy-running history flag has been set as 1 or after it is determined in STEP 4 that the N-economy-running history flag has been set as 0, the processing in STEP 1 is resumed. By repeating the foregoing procedures, the N-economy-running history flag is updated constantly. It is to be noted, however, that the procedures in STEP 1 to STEP 4 are withheld during a shift from N range to D range. The N-economy-running history flag in this case is maintained at an original value in the N range. The procedures in STEP 1 to STEP 4 are performed after the shift has been made.

After the N-economy-running history flag has been set as 1 or 0 or updated through the procedures performed by the controller performing the non-running range state determination procedure as described with reference to FIG. 1A, the procedures shown in FIG. 1B are performed in the automatic transmission or the like during a shift from a non-running range to a running range. Performing this procedure solves a problem regarding conformity between friction coupling characteristics of a friction coupling element and input characteristics of the automatic transmission and to achieve optimal transition characteristics and optimal speed-change characteristics.

STEP 11 represents a procedure of determining whether or not the N-economy-running history flag has been set as 1 during a shift from a non-running range to a running range.

STEP 12 represents a procedure through which the controller of the automatic transmission performs the control operation in the first case if the result in STEP 11 is NO. Accordingly, the control operation in the first case is performed if the vehicle is in a non-economy-running state, namely, if the engine is running during a shift from a non-running range to a running range.

STEP 13 represents a procedure through which the automatic transmission or the like is controlled to perform the control operation in the second case if the result in STEP 11 is YES. Accordingly, the control operation in the second case is performed if the vehicle is in an economy-running state, e.g., if the engine is stopped automatically during a shift from a non-running range to a running range.

Hereinafter, the control operations that are performed by the controller of the automatic transmission or the like in the first and second cases in STEP 12 and STEP 13 of the flowchart shown in FIG. 1B will be described as the three embodiments of the invention.

Figure 2B:
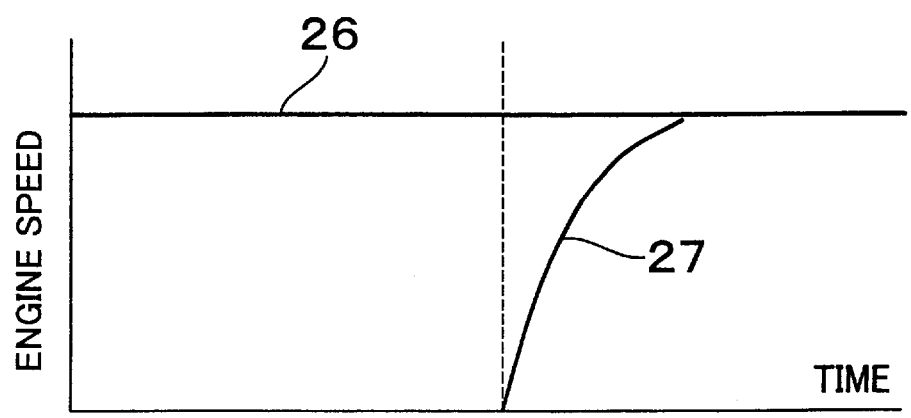

FIGS. 2A and 2B are graphs for respectively illustrating the control operations that are performed by the controller in the first and second cases according to the first embodiment of the invention. While the axis of abscissa represents time, the axes of ordinate in FIGS. 2A and 2B represent original hydraulic pressure supplied to the automatic transmission and engine speed respectively. Each of FIGS. 2A and 2B show changes in the state of the vehicle, which is in a non-running range on the left side, shifted to a running range substantially at the center, and settles in the running range on the right side. In each of FIGS. 2A and 2B, a broken line indicates a time when the vehicle is shifted from the non-running range to the running range. For convenience of explanation, a symbol "→" indicating a shift from N range to D range is used, and the following description will continue to handle a case where the vehicle is shifted from N range to D range. It is to be noted, however, that N includes P range as well as N range and that D includes R range as well as D range.

In a state of N range shown on the left in FIG. 2A, a mechanical oil pump driven by the engine supplies an original pressure 21 when the N-economy-running history flag is set as 0, e.g., when the vehicle is in a non-economy-running state in which the engine is running. The original pressure 21 is sufficiently high. On the other hand, an electric oil pump or the like supplies an original pressure 22 when the N-economy-running history flag is set as 1, namely, when the vehicle is in an economy-running state in which the engine has been stopped automatically. The original pressure 22 is lower than the original pressure 21.

In the first case where the sufficiently high original pressure 21 has already formed at the time of a shift from N range to D range, it is appropriate for the controller to perform hydraulic pressure control normally. On the other hand, in the second case where the original pressure 22 is lower than the original pressure 21 has formed, if the engine is restarted upon a shift to D range, the mechanical oil pump is driven and the original pressure rises gradually (as indicated by a curve 23). If the curve 23 indicating a rise in original pressure in the second case is then compared with the original pressure 21 in the first case, it becomes apparent that there is a difference 24. Hydraulic pressure control in the second case is performed as pressure-raising control so as to compensate for the difference 24. For instance, hydraulic pressure compensation control or the like is performed to compensate for a line pressure in a hydraulic circuit connected to an axle clutch functioning as the friction coupling element in the automatic transmission.

In FIG. 2B, the axis of ordinate represents output speed of the engine, whereas the axis of abscissa represents time as in the case of FIG. 2A. In a state of N range on the left in FIG. 2B, the engine runs at a sufficiently high speed 26 if the vehicle is in a non-economy-running state. The engine speed is 0 if the vehicle is in an economy-running state. In contrast with the first case where the engine already runs at the sufficiently high speed 26 at the time of a shift from N range to D range, in the second case where the engine speed is zero, the engine is restarted upon a shift to D range and generates a torque as the engine speed rises gradually (as indicated by a curve 27). For the sake of conformity with the curve 27 indicating a rise in the engine output, hydraulic pressure compensation control is performed to compensate for a line pressure in the hydraulic circuit connected to the axle clutch functioning as the friction coupling element in the automatic transmission, whereby it becomes possible to achieve optimal transition characteristics and optimal speed-change characteristics.

The first embodiment of the invention is characterized in that the friction coupling characteristics of the friction coupling element and the input characteristics of the automatic transmission are conformed with each other by performing normal control in the first case and hydraulic pressure compensation control in the second case.

Figure 3:
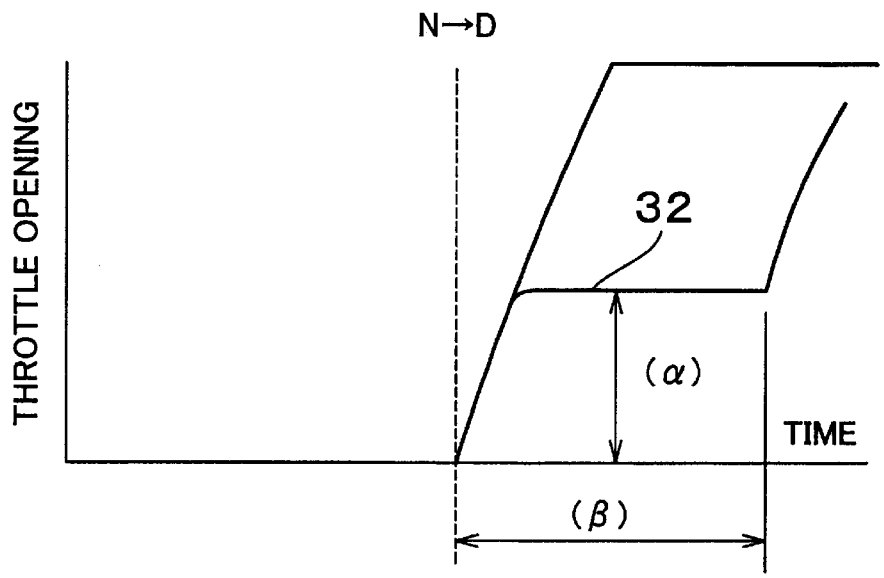
FIG. 3 is a graph that illustrates a control operation performed in first and second cases according to the second embodiment of the invention (the axes of the abscissa and the ordinate represent time and throttle opening respectively)

FIG. 3 is a graph that illustrates the control operation performed by the controller in the first and second cases according to the second embodiment of the invention. While the axis of abscissa represents time as in the case of FIG. 2, the axis of ordinate represents throttle opening characteristics in the case where an acceleration pedal is depressed upon a shift from N range to D range. On the left in FIG. 3, the accelerator pedal has not been depressed. In the first case where the accelerator pedal is depressed upon a shift to D range in a non-economy-running state in which the engine is running in N range, because the original hydraulic pressure supplied to the axle clutch is sufficiently high, it is appropriate that the throttle opening demonstrate normal characteristics 31.

On the other hand, in the second case where the accelerator pedal is depressed upon a shift to D range in an economy-running state in which the engine has been stopped automatically in N range, engagement of the axle clutch requires a time that depends on the rising characteristics of the original hydraulic pressure supplied to the axle clutch. Therefore, if the throttle opening is made to demonstrate the normal characteristics, the engine reaches a high speed so swiftly that conformity with the rising of the friction coupling characteristics of the axle clutch cannot be achieved. To guarantee conformity, the throttle opening is performed to demonstrate characteristic 32. In other words, the throttle opening is maintained at an intermediate opening (α in FIG. 3) for a certain period (β in FIG. 3), whereby it becomes possible to achieve optimal transition characteristics and optimal speed-change characteristics.

The second embodiment of the invention is characterized in that the friction coupling characteristics of the friction coupling element and the input characteristics of the automatic transmission are conformed with each other by performing normal control in the first case and loosening control in the second case as regards the throttle opening characteristics of the accelerator pedal whose opening is controlled by the controller.

Figure 4:
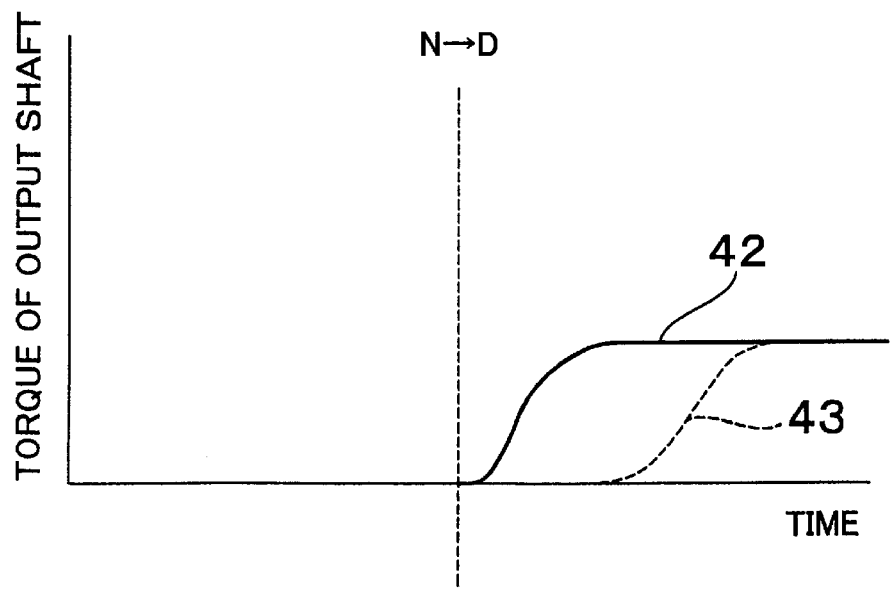
FIG. 4 is a graph that illustrates control operations performed in first and second cases according to the third embodiment of the invention (the axes of the abscissa and the ordinate represent time and torque of an output shaft respectively)
Figure 5:
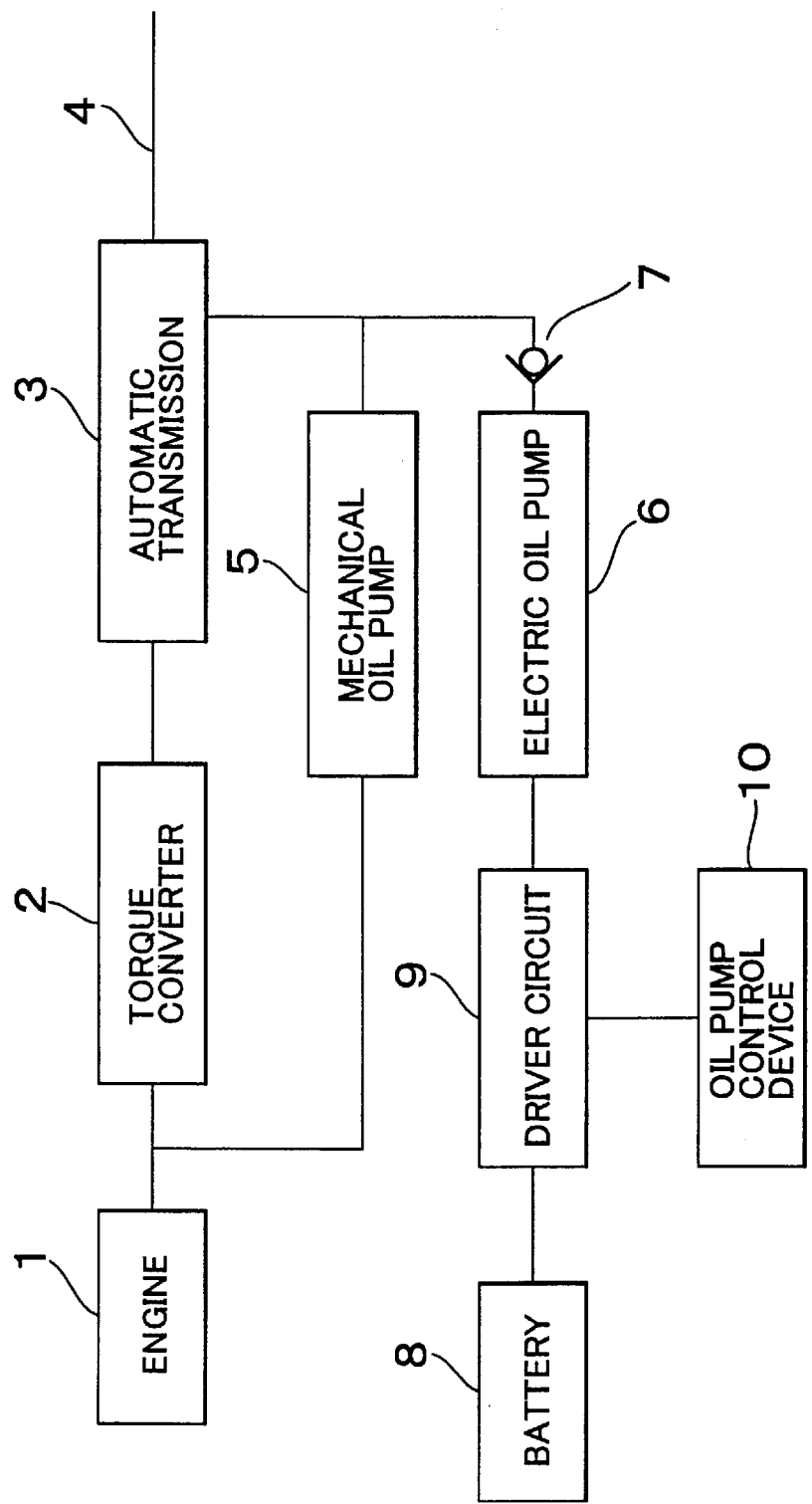
FIG. 5 is an exemplary diagram showing how component members of an economy running vehicle are arranged in relation to one another, and how an electric oil pump is arranged in relation to the other component members.

FIG. 4 is a graph that illustrates the control operations performed in the first and second cases according to the third embodiment of the invention. Anti-squat shifting control as one of the control operations performed in the automatic transmission is designed to optimize the friction coupling characteristics of the friction coupling element and smoothen temporal changes in torque of the output shaft so as to absorb a shock caused in changing the manually set mode, for example, in making a shift from N range to D range. In FIG. 4, while the axis of abscissa represents time as in the case of FIG. 2, the axis of ordinate represents torque of the output shaft in the case where anti-squat shifting control is performed in making a shift from N range to D range (e.g. the first speed). In the first case where a shift to D range is made in a non-economy-running state in which the engine is running in N range, the torque of the output shaft demonstrates characteristics 42 complying with normal anti-squat shifting control.

On the other hand, in the second case where a shift to D range is made in an economy-running state in which the engine has been stopped automatically in N range, the output torque rises depending on the rising characteristics of the friction coupling characteristics of the axle clutch. Hence, if anti-squat shifting control is performed in this state, the torque of the output shaft demonstrates characteristics 43. That is, the torque of the output shaft rises with a time lag. Hence, anti-squat shifting control is prohibited in the second case, whereby it becomes possible to ensure conformity with the friction coupling characteristics of the axle clutch and achieve optimal transition characteristics and optimal speed-change characteristics.

The third embodiment of the invention is characterized in that the friction coupling characteristics of the friction coupling element and the input characteristics of the automatic transmission are conformed with each other by performing anti-squat shifting control for the automatic transmission in the first case and prohibiting anti-squat shifting control in the second case.

In the third embodiment of the invention, anti-squat shifting control for the automatic transmission has been described from the standpoint of the rising of the torque of the output shaft. However, anti-squat shifting control is also performed in controlling a suspension system, for example, in controlling damping forces of the front and rear suspensions. Thus, regarding the anti-squat shifting control performed in controlling the suspension system, the invention can be implemented by performing anti-squat shifting control differently depending on whether the first case or the second case matters.

FIG. 6 is a block diagram illustrating one exemplary embodiment of a system for controlling an automatic stop/restart-type vehicle according to this invention. In FIG. 6, a controller 100 is interconnected to an engine 120 an automatic transmission 135 with a coupling element 130and an electric oil pump 140. A mechanical oil pump 110 pumps oil when the engine 120 is on. The controller controls the output from the engine 120. The controller 100 also controls the hydraulic pressure supplied to the transmission 135 by the electric oil pump 140 when the mechanical oil pump is not being powered by the engine 120, that is when the engine 120 is off. The controller 100 determines that the engine is in an automatic stop state when a manually set mode of the transmission 135 is shifted from a not running range to a running range. Then. the controller 100 performs hydraulic pressure compensation with the electric oil pump 140 so as to conform friction coupling characteristics of the coupling element 130 and the input characteristics of the transmission 135 with each other if the controller 100 determines the engine 120 is in the automatic stop state.

FIG. 7 is a block diagram illustrating another exemplary embodiment of a system for controlling an automatic engine stop/restart-type vehicle according to this invention. In FIG. 7, multiple controllers are employed for controlling each element of the system. In FIG. 7, the engine 220 is connected to the coupling element 235 of the automatic transmission 230. The engine also is connected to a mechanical oil pump 210. The automatic transmission is connected to the oil electric pump 240. The electric oil pump 240 supplies hydraulic pressure to the automatic transmission 230 when the engine 220 is in the off state.

As shown in FIG. 7, a first controller 222 controls the output torque from the engine 220. The second controller 232 controls the hydraulic pressure supplied to the transmission 230 by the electric oil pump 240. The transmission 230 has a coupling element 235 that transmits the output torque of the engine 220. A third controller 242 determines whether the engine 220 is in an automatic stop state when a manually set mode of the transmission is shifted from a non running range to a running range. The third controller 242 then performs hydraulic pressure compensation using the electric oil pump 240 so as to conform friction coupling characteristics of the coupling element 235 and the input characteristics of the transmission 230 with each other when the third controller 242 determines that the engine 220 is in the automatic stop state.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments arc shown in various combinations and configurations, which are exemplary, other combinations and configurations, including more, less or only a single element, are also within the spirit and scope of the invention.

What is claimed is:

1. A vehicle having an engine that is stopped automatically upon fulfillment of at least one predetermined running condition of the vehicle, comprising:

a transmission having a coupling element that transmits an output torque of the engine;

an oil pump that supplies a hydraulic pressure to the transmission; and a controller that:
controls an output from the engine;
controls the hydraulic pressure supplied to the transmission;
determines whether the engine is in an automatic stop state when a manually set mode of the transmission is shifted from a non-running range to a running range; and
performs hydraulic pressure compensation so as to conform friction coupling characteristics of the coupling element and input characteristics of the transmission with each other if the controller determines that the engine is in the automatic stop state, wherein if the engine is in the automatic stop state when the manually set mode of the transmission is shifted from the non-running range to the running range, the hydraulic pressure supplied to the transmission is changed as compared with if the engine is operated when the manually set mode of the transmission is shifted from the non-running range to the running range.

2. The vehicle according to claim 1, wherein the oil pump is driven by an output from the engine.

3. The vehicle according to claim 1, wherein the oil pump comprises:
a mechanical oil pump that is driven by an output from the engine; and
an electric oil pump that is driven by an electric power from a battery in the vehicle,
wherein the electric oil pump is operated if the controller determines that the engine is in the automatic stop state.

4. The vehicle according to claim 1, wherein the hydraulic pressure compensation is performed to compensate for the hydraulic pressure in relation to a line pressure in a hydraulic circuit connected to an axle clutch, which functions as the coupling element in the transmission.

5. A vehicle having an engine that is stopped automatically upon fulfillment of at least one predetermined running condition of the vehicle, comprising:
a transmission having a coupling element that transmits an output torque of the engine;
an oil pump that supplies a hydraulic pressure to the transmission; and
a controller that:
controls an output from the engine;
controls the hydraulic pressure supplied to the transmission;
determines whether the engine is in an automatic stop state when a manually set mode of the transmission is shifted from a non-running range to a running range; and
performs a loosening control of throttle opening characteristics in relation to an accelerator opening so as to conform friction coupling characteristics of the coupling element and input characteristics of the transmission with each other if the controller determines that the engine is in the automatic stop state, wherein if the engine is in the automatic stop state when the manually set mode of the transmission is shifted from the non-running range to the running range, an output characteristic of the engine is changed as compared with if the engine is operated when the manually set mode of the transmission is shifted from the non-running range to the running range.

6. The vehicle according to claim 5, wherein the oil pump is driven by an output from the engine.

7. The vehicle according to claim 5, wherein the oil pump comprises:
a mechanical oil pump that is driven by an output from the engine; and
an electric oil pump that is driven by an electric power from a battery in the vehicle,
wherein the electric oil pump is operated if the controller determines that the engine is in the automatic stop state.

8. The vehicle according to claim 5, wherein: the loosening control is performed to maintain the throttle opening at a predetermined opening for a predetermined period, and
the predetermined throttle opening is smaller than the throttle opening in the case where the engine has not been stopped automatically.

9. A vehicle having an engine that is stopped automatically upon fulfillment of at least one predetermined running condition of the vehicle, comprising:
a transmission having a coupling element that transmits an output torque of the engine;
an oil pump that supplies a hydraulic pressure to the transmission; and
a controller that:
controls an output from the engine;
controls the hydraulic pressure supplied to the transmission;
determines whether the engine is in an automatic stop state when a manually set mode of the transmission is shifted from a non-running range to a running range; and
prohibits an anti-squat shifting control that absorbs an impact caused in changing the manually set mode of the transmission so as to conform friction coupling characteristics of the coupling element and input characteristics of the transmission with each other if the controller determines that the engine is in the automatic stop state.

10. The vehicle according to claim 9, wherein the oil pump is driven by an output from the engine.

11. The vehicle according to claim 9, wherein the oil pump comprises:
a mechanical oil pump that is driven by an output from the engine; and
an electric oil pump that is driven by an electric power from a battery in the vehicle,
wherein the electric oil pump is operated if the controller determines that the engine is in the automatic stop state.

12. The vehicle according to claim 9, wherein the anti-squat shifting control is performed to optimize friction coupling characteristics of the coupling element and smoothen temporal changes in torque of an output shaft of the engine.

13. A method of controlling a vehicle comprising: an engine that is stopped automatically upon fulfillment of at least one predetermined running condition of the vehicle; a controller that controls an output from the engine; a transmission having a coupling element that transmits an output torque of the engine; an oil pump that supplies a hydraulic pressure to the transmission; and a control device that controls the hydraulic pressure supplied to the automatic transmission, comprising the steps of:
determining whether the engine is in an automatic stop state when a manually set mode of the transmission is shifted from a non-running range to a running range; and performing hydraulic pressure compensation in the control device so as to conform friction coupling characteristics of the coupling element and input characteristics of the transmission with each other if it is determined that the engine is in the automatic stop state, wherein if the engine is in the automatic stop state when the manually set mode of the transmission is shifted from the non-running range to the running range, the hydraulic pressure supplied to the transmission is changed as compared with if the engine is operated when the manually set mode of the transmission is shifted from the non-running range to the running range.

14. A method of controlling a vehicle comprising: an engine that is stopped automatically upon fulfillment of at least one predetermined running condition of the vehicle; a controller that controls an output from the engine; a transmission having a coupling element that transmits an output torque of the engine; an oil pump that supplies a hydraulic pressure to the transmission; and a control device that controls the hydraulic pressure supplied to the transmission, comprising the steps of:

determining whether the engine is in an automatic stop state when a manually set mode of the transmission is shifted from a non-running range to a running range; and performing loosening control of a throttle opening characteristics in relation to an accelerator opening so as to conform friction coupling characteristics of the coupling element and input characteristics of the transmission with each other if it is determined that the engine is in the automatic stop state, wherein if the engine is in the automatic stop state when the manually set mode of the transmission is shifted from the non-running range to the running range, an output characteristic of the engine is changed as compared with if the engine is operated when the manually set mode of the transmission is shifted from the non-running range to the running range.

15. A method of controlling a vehicle comprising: an engine that is stopped automatically upon fulfillment of at least one predetermined running condition of the vehicle; a controller that controls an output from the engine; a transmission having a coupling element that transmits an output torque of the engine; an oil pump that supplies a hydraulic pressure to the transmission; and a control device that controls the hydraulic pressure supplied to the transmission, comprising the steps of:

determining whether the engine is in an automatic stop state when a manually set mode of the transmission is shifted from a non-running range to a running range; and prohibiting anti-squat shifting control for absorbing an impact caused in changing the manually set mode of the transmission so as to conform friction coupling characteristics of the coupling element and input characteristics of the transmission with each other if it is determined that the engine is in the automatic stop state.

16. Automatic engine stop control apparatus that stops an engine automatically upon fulfillment of at least one predetermined running condition of the vehicle, comprising:

a first controller that controls an output torque from the engine;

a second controller that controls a hydraulic pressure supplied to a transmission having a coupling element that transmits the output torque of the engine; and a third controller that determines whether the engine is in an automatic stop state when a manually set mode of the transmission is shifted from a non-running range to a running range; and performs hydraulic pressure compensation so as to conform friction coupling characteristics of the coupling element and input characteristics of the transmission with each other if the third controller determines that the engine is in the automatic stop state, wherein if the engine is in the automatic stop state when the manually set mode of the transmission is shifted from the non-running range to the running range, the hydraulic pressure supplied to the transmission is changed as compared with if the engine is operated when the manually set mode of the transmission is shifted from the non-running range to the running range.

17. Automatic engine stop control apparatus that stops an engine automatically upon fulfillment of at least one predetermined running condition of the vehicle, comprising:

a first controller that controls an output torque from the engine;

a second controller that controls a hydraulic pressure supplied to a transmission having a coupling element that transmits the output torque of the engine; and a third controller that determines whether the engine is in an automatic stop state when a manually set mode of the transmission is shifted from a non-running range to a running range; and performs a loosening control of throttle opening characteristics in relation to an accelerator opening so as to conform friction coupling characteristics of the coupling element and input characteristics of the transmission with each other if the third controller determines that the engine is in the automatic stop state, wherein if the engine is in the automatic stop state when the manually set mode of the transmission is shifted from the non-running range to the running range, an output characteristic of the engine is changed as compared with if the engine is operated when the manually set mode of the transmission is shifted from the non-running range to the running range.

18. Automatic engine stop control apparatus that stops an engine automatically upon fulfillment of at least one predetermined running condition of the vehicle, comprising:

a first controller that controls an output torque from the engine;

a second controller that controls a hydraulic pressure supplied to a transmission having a coupling element that transmits the output torque of the engine; and a third controller that determines whether the engine is in an automatic stop state when a manually set mode of the transmission is shifted from a non-running range to a running range; and prohibits an anti-squat shifting control that absorbs an impact caused in changing the manually set mode of the transmission so as to conform friction coupling characteristics of the coupling element and input characteristics of the transmission with each other if the third controller determines that the engine is in the automatic stop state.

* * * * *